US007783505B2

(12) United States Patent
Roschelle et al.

(10) Patent No.: US 7,783,505 B2
(45) Date of Patent: Aug. 24, 2010

(54) SYSTEM AND METHOD FOR COMPUTERIZED INSURANCE RATING

(75) Inventors: Perry M. Roschelle, East Brunswick, NJ (US); Leonard G. Fiorilli, New York, NY (US); Oai T. Tran, Piscataway, NJ (US); Michael Robert McKernan, Prospect, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 12/291,649

(22) Filed: Nov. 12, 2008

(65) Prior Publication Data

US 2009/0150191 A1 Jun. 11, 2009

Related U.S. Application Data

(63) Continuation-in-part of application No. 11/025,548, filed on Dec. 28, 2004.

(60) Provisional application No. 60/533,753, filed on Dec. 30, 2003.

(51) Int. Cl.
*G06Q 40/00* (2006.01)
(52) U.S. Cl. ............................................. 705/4; 705/35
(58) Field of Classification Search .................. 705/4, 705/35, 38; 283/54; 715/212, 215, 217, 715/219, 220
See application file for complete search history.

(56) References Cited

U.S. PATENT DOCUMENTS

| 4,667,336 | A | 5/1987 | Best |
| 4,975,840 | A | 12/1990 | DeTore et al. |
| 5,182,705 | A | 1/1993 | Barr et al. |
| 5,557,514 | A | 9/1996 | Seare et al. |
| 5,619,991 | A | 4/1997 | Sloane |
| 5,635,693 | A | 6/1997 | Benson et al. |
| 5,680,329 | A | 10/1997 | Lloyd et al. |

(Continued)

FOREIGN PATENT DOCUMENTS

CA 2415013 A1 6/2004

(Continued)

OTHER PUBLICATIONS

M2 Presswire. Actuate: Actuate launches new division to tap J2EE application development market; Reporting engines delivers crucial reporting tools to 1.5 million Java developers. Coventry: Feb. 5, 2003. p. 1.*

(Continued)

*Primary Examiner*—Hani Kazimi
*Assistant Examiner*—Muriel Tinkler
(74) *Attorney, Agent, or Firm*—Howard IP Law Group, PC

(57) ABSTRACT

The invention relates generally to a computer system and method for integrating insurance policy underwriting. In one aspect, it integrates an older legacy insurance policy generating system to on-line rating systems where users access the system through browsers. The computer system to perform the process of dynamically rating includes generating an input XML file of risk information that is sent to a web service and calculated in a calculation engine. The processed data is retrieved by the web service and transmitted as an XML file to a user interface that parses the rating information and displays the data.

22 Claims, 5 Drawing Sheets

U.S. PATENT DOCUMENTS

| | | | |
|---|---|---|---|
| 5,772,585 | A | 6/1998 | Lavin et al. |
| 5,794,216 | A | 8/1998 | Brown |
| 5,797,134 | A | 8/1998 | McMillan et al. |
| 5,819,228 | A | 10/1998 | Spiro |
| 5,825,283 | A | 10/1998 | Camhi |
| 5,835,897 | A | 11/1998 | Dang |
| 5,842,148 | A | 11/1998 | Prendergast et al. |
| 5,845,254 | A | 12/1998 | Lockwood et al. |
| 5,890,129 | A | 3/1999 | Spurgeon |
| 5,933,809 | A | 8/1999 | Hunt et al. |
| 5,950,150 | A | 9/1999 | Lloyd et al. |
| 5,956,690 | A | 9/1999 | Haggerson et al. |
| 5,970,464 | A | 10/1999 | Apte et al. |
| 5,974,389 | A | 10/1999 | Clark et al. |
| 5,991,729 | A | 11/1999 | Barry et al. |
| 6,035,276 | A | 3/2000 | Newman et al. |
| 6,064,970 | A | 5/2000 | McMillian et al. |
| 6,067,488 | A | 5/2000 | Tano |
| 6,078,857 | A | 6/2000 | Jung et al. |
| 6,112,183 | A | 8/2000 | Swanson et al. |
| 6,112,225 | A | 8/2000 | Kraft et al. |
| 6,154,658 | A | 11/2000 | Caci |
| 6,163,277 | A | 12/2000 | Gehlot |
| 6,182,048 | B1 | 1/2001 | Osborn et al. |
| 6,204,757 | B1 | 3/2001 | Evans et al. |
| 6,211,777 | B1 | 4/2001 | Greenwood et al. |
| 6,223,125 | B1 | 4/2001 | Hall |
| 6,246,934 | B1 | 6/2001 | Otake et al. |
| 6,283,761 | B1 | 9/2001 | Joao |
| 6,307,965 | B1 | 10/2001 | Aggarwal et al. |
| 6,324,516 | B1 | 11/2001 | Shults et al. |
| 6,341,265 | B1 | 1/2002 | Provost et al. |
| 6,343,271 | B1 | 1/2002 | Peterson et al. |
| 6,389,340 | B1 | 5/2002 | Rayner |
| 6,438,533 | B1 | 8/2002 | Spackman et al. |
| 6,502,020 | B2 | 12/2002 | Lang |
| 6,529,876 | B1 | 3/2003 | Dart et al. |
| 6,563,423 | B2 | 5/2003 | Smith |
| 6,583,734 | B2 | 6/2003 | Bates et al. |
| 6,594,579 | B1 | 7/2003 | Lowrey et al. |
| 6,611,740 | B2 | 8/2003 | Lowrey et al. |
| 6,611,846 | B1 | 8/2003 | Stoodley |
| 6,636,790 | B1 | 10/2003 | Lightner et al. |
| 6,643,578 | B2 | 11/2003 | Levine |
| 6,655,583 | B2 | 12/2003 | Walsh et al. |
| 6,684,189 | B1 | 1/2004 | Ryan et al. |
| 6,710,738 | B2 | 3/2004 | Allen, Jr. |
| 6,732,031 | B1 | 5/2004 | Lightner et al. |
| 6,735,525 | B1 | 5/2004 | Murphy |
| 6,754,485 | B1 | 6/2004 | Obradovich et al. |
| 6,756,915 | B2 | 6/2004 | Choi |
| 6,757,898 | B1 | 6/2004 | Ilsen et al. |
| 6,767,330 | B2 | 7/2004 | Lavery et al. |
| 6,768,417 | B2 | 7/2004 | Kuragaki et al. |
| 6,792,410 | B1 | 9/2004 | Donovan et al. |
| 6,795,759 | B2 | 9/2004 | Doyle |
| 6,823,258 | B2 | 11/2004 | Ukal et al. |
| 6,826,536 | B1 | 11/2004 | Forman |
| 6,832,141 | B2 | 12/2004 | Skeen et al. |
| 6,839,305 | B2 | 1/2005 | Perlman et al. |
| 6,853,956 | B2 | 2/2005 | Ballard, Jr. et al. |
| 6,868,339 | B2 | 3/2005 | Murphy et al. |
| 6,868,386 | B1 | 3/2005 | Henderson et al. |
| 6,871,199 | B1 | 3/2005 | Binnig et al. |
| 6,879,959 | B1 | 4/2005 | Chapman et al. |
| 6,886,016 | B2 | 4/2005 | Hansen et al. |
| 6,915,265 | B1 | 7/2005 | Johnson |
| 6,915,266 | B1 | 7/2005 | Saeed et al. |
| 6,920,379 | B2 | 7/2005 | Miyamoto |
| 6,925,425 | B2 | 8/2005 | Remboski et al. |
| 6,931,309 | B2 | 8/2005 | Phelan et al. |
| 6,957,133 | B1 | 10/2005 | Hunt et al. |
| 6,957,218 | B1 | 10/2005 | Wyatt |
| 6,965,326 | B2 | 11/2005 | Allison |
| 6,968,453 | B2 | 11/2005 | Doyle et al. |
| 6,973,319 | B2 | 12/2005 | Ormson |
| 6,977,612 | B1 | 12/2005 | Bennett |
| 6,985,922 | B1 | 1/2006 | Bashen et al. |
| 6,987,964 | B2 | 1/2006 | Obradovich et al. |
| 7,017,142 | B1 | 3/2006 | Ehnebuske et al. |
| 7,069,118 | B2 | 6/2006 | Coletrane et al. |
| 2001/0016872 | A1 | 8/2001 | Kusuda |
| 2001/0037224 | A1 | 11/2001 | Eldridge et al. |
| 2001/0039509 | A1 | 11/2001 | Dar et al. |
| 2001/0044733 | A1 | 11/2001 | Lee et al. |
| 2002/0002475 | A1* | 1/2002 | Freedman et al. ............... 705/4 |
| 2002/0007284 | A1 | 1/2002 | Schurenberg et al. |
| 2002/0013717 | A1 | 1/2002 | Ando et al. |
| 2002/0019754 | A1 | 2/2002 | Peterson et al. |
| 2002/0022976 | A1 | 2/2002 | Hartigan |
| 2002/0035529 | A1 | 3/2002 | Tooke, III |
| 2002/0052765 | A1 | 5/2002 | Taylor |
| 2002/0055861 | A1 | 5/2002 | King et al. |
| 2002/0077869 | A1 | 6/2002 | Doyle et al. |
| 2002/0091550 | A1 | 7/2002 | White et al. |
| 2002/0103622 | A1 | 8/2002 | Burge |
| 2002/0111725 | A1 | 8/2002 | Burge |
| 2002/0111833 | A1 | 8/2002 | Dick |
| 2002/0115423 | A1 | 8/2002 | Hatae et al. |
| 2002/0128882 | A1 | 9/2002 | Nakagawa et al. |
| 2002/0148893 | A1 | 10/2002 | Walsh et al. |
| 2002/0165739 | A1 | 11/2002 | Guyan et al. |
| 2002/0173885 | A1 | 11/2002 | Lowrey et al. |
| 2002/0178033 | A1 | 11/2002 | Yoshioka et al. |
| 2002/0188467 | A1 | 12/2002 | Eke |
| 2002/0198741 | A1 | 12/2002 | Randazzo |
| 2003/0009357 | A1 | 1/2003 | Pish |
| 2003/0028406 | A1 | 2/2003 | Herz et al. |
| 2003/0033057 | A1 | 2/2003 | Kallestad |
| 2003/0046107 | A1 | 3/2003 | Eisenberg et al. |
| 2003/0083903 | A1 | 5/2003 | Myers |
| 2003/0093302 | A1 | 5/2003 | Quido et al. |
| 2003/0093366 | A1 | 5/2003 | Halper et al. |
| 2003/0120516 | A1 | 6/2003 | Perednia |
| 2003/0139948 | A1 | 7/2003 | Strech |
| 2003/0154009 | A1 | 8/2003 | Basir et al. |
| 2003/0158758 | A1 | 8/2003 | Kanazawa et al. |
| 2003/0171956 | A1 | 9/2003 | Cox et al. |
| 2003/0187702 | A1 | 10/2003 | Bonissone et al. |
| 2003/0187704 | A1 | 10/2003 | Hashiguchi et al. |
| 2003/0221118 | A1 | 11/2003 | Walker |
| 2003/0229522 | A1* | 12/2003 | Thompson et al. ............. 705/4 |
| 2003/0233261 | A1 | 12/2003 | Kawahara et al. |
| 2003/0233278 | A1 | 12/2003 | Marshall |
| 2003/0233323 | A1 | 12/2003 | Bilski et al. |
| 2004/0036601 | A1 | 2/2004 | Obradovich |
| 2004/0039611 | A1 | 2/2004 | Hong et al. |
| 2004/0117217 | A1 | 6/2004 | Reber et al. |
| 2004/0139034 | A1 | 7/2004 | Farmer |
| 2004/0148201 | A1 | 7/2004 | Smith et al. |
| 2004/0153362 | A1 | 8/2004 | Bauer et al. |
| 2004/0153762 | A1 | 8/2004 | Flynn et al. |
| 2004/0181495 | A1 | 9/2004 | Grush et al. |
| 2004/0215494 | A1 | 10/2004 | Wahlbin et al. |
| 2004/0225535 | A1 | 11/2004 | Bond et al. |
| 2004/0243450 | A1 | 12/2004 | Bernard et al. |
| 2004/0249557 | A1 | 12/2004 | Harrington et al. |
| 2004/0249679 | A1 | 12/2004 | Henderson et al. |
| 2004/0260577 | A1 | 12/2004 | Dahlin et al. |
| 2004/0260579 | A1 | 12/2004 | Tremiti |
| 2004/0267577 | A1 | 12/2004 | Nakai |
| 2005/0038682 | A1 | 2/2005 | Gandee et al. |
| 2005/0055248 | A1 | 3/2005 | Helitzer et al. |
| 2005/0055249 | A1 | 3/2005 | Helitzer et al. |

| | | | |
|---|---|---|---|
| 2005/0065682 A1 | 3/2005 | Kapadia et al. | |
| 2005/0070299 A1 | 3/2005 | Caspi et al. | |
| 2005/0071202 A1 | 3/2005 | Kendrick | |
| 2005/0075067 A1 | 4/2005 | Lawson et al. | |
| 2005/0091175 A9 | 4/2005 | Farmer | |
| 2005/0102172 A1 | 5/2005 | Sirmans, Jr. | |
| 2005/0108065 A1 | 5/2005 | Dorfstatter | |
| 2005/0174217 A1 | 8/2005 | Basir et al. | |
| 2005/0192730 A1 | 9/2005 | Churchill et al. | |
| 2005/0216583 A1 | 9/2005 | Cole et al. | |
| 2005/0278082 A1 | 12/2005 | Weekes | |
| 2005/0285748 A1 | 12/2005 | Pedraza et al. | |
| 2006/0000420 A1 | 1/2006 | Davies | |
| 2006/0009289 A1 | 1/2006 | McCarten et al. | |
| 2006/0033625 A1 | 2/2006 | Johnson et al. | |
| 2006/0036473 A1 | 2/2006 | Taylor | |
| 2006/0053038 A1 | 3/2006 | Warren et al. | |

FOREIGN PATENT DOCUMENTS

| | | | |
|---|---|---|---|
| EP | 1160701 A1 | 5/2001 | |
| EP | 1145163 B1 | 10/2001 | |
| EP | 1160707 A1 | 12/2001 | |
| EP | 1241599 A1 | 9/2002 | |
| EP | 1313043 A1 | 5/2003 | |
| EP | 1544771 A1 | 6/2005 | |
| EP | 1583013 A1 | 10/2005 | |
| JP | 2001118175 A | 4/2001 | |
| JP | 2001319051 A | 11/2001 | |
| JP | 2002092764 A | 3/2002 | |
| JP | 2002109229 A | 4/2002 | |
| JP | 2002133117 A | 5/2002 | |
| JP | 2002183456 A | 6/2002 | |
| JP | 2002329071 A | 11/2002 | |
| JP | 2002373259 A | 12/2002 | |
| JP | 2003131901 A | 5/2003 | |
| JP | 2003131905 | 5/2003 | |
| JP | 2004013234 A | 1/2004 | |
| JP | 2004017901 A | 1/2004 | |
| JP | 2004059013 A | 2/2004 | |
| JP | 2004078393 A | 3/2004 | |
| JP | 2004240688 | 8/2004 | |
| WO | WO 91/15817 A1 | 10/1991 | |
| WO | WO 99/21116 A1 | 4/1999 | |
| WO | WO 01/04821 A1 | 1/2001 | |
| WO | WO 01/11501 A1 | 2/2001 | |
| WO | WO 01/63445 A2 | 8/2001 | |
| WO | WO 01/63534 A2 | 8/2001 | |
| WO | WO 03/058381 A1 | 7/2003 | |
| WO | WO 03/065268 A1 | 8/2003 | |
| WO | WO 03/090130 A1 | 10/2003 | |
| WO | WO 2004/100024 | 11/2004 | |

OTHER PUBLICATIONS

Detmer, Don. Integrated personal Health Records: Transformative Tools for Consumer-Centric Care. BMC Medical Informatics and Decision Making. Volumn 8. Published Oct. 6, 2008.*

Janner, Till et al. A Core Component-based Modelling Approach for Achieving e-Business Semantics Interoperability. Journal of Theoretical and Applied Electronic Commerce Research. vol. 3, Issue 3. Dec. 2008. pp. 1-16.*

Nguyen, Lam et al. DADOS-Prospective: an open source applciation for Web-based prospective data collection. Source Code for Biology and Medicine. Volumn 1. Published Nov. 13, 2006.*

Apte et al., "Business Applications of Data Mining", Communications of the ACM, vol. 45, No. 8, Publisher: ACM, pp. 49-53, Aug. 2002.

Apte et al., "Insurance Risk Modeling Using Data Mining Technology", IBM Thomas J. Watson Res. Center, Yorktown Heights, NY, USA, Conference: PADD99. Proceedings of the Third International Conference on the Practical Application of Knowledge Discovery and Data Mining, Publisher: Practical Application Company, Blackpool, UK, 209 pages, 1999.

Dorn et al., "Insurance Industry Databases", Database: (Weston), vol. 21, No. 5, pp. 68-71, Oct./Nov. 1998.

Foran, D. J. et al., "A Distributed Health Information Network for Consultative Services in Surgical Pathology", IEEE 17th annual conference in Engineering in medicine and biology society, vol. 1, pp. 751-752, 1995.

Gallagher, Cecily "Risk Classification Aided by New Software Tool", National Underwriter Property & Casualty Risk Benefits and Management, No. 17, p. 19, Apr. 27, 1992.

Practice 2000 for medical & dental practices, Abaki Pty ltd., 13 pages; 1994-2003.

Saha, "The New Age Electronic Patient Record System", IEEE Biomedical Engineering Conference, pp. 134-137, Apr. 1995.

IrisNet: The 'Seeing' Internet, www.intel.com, 2005.

* cited by examiner

Encore Proposed Terms

| | Option 1: copy from ▼ | | | Option 2: copy from ▼ | | | Option 3: copy from ▼ | | |
|---|---|---|---|---|---|---|---|---|---|
| | Limit | Ret. | Prem. | Limit | Ret. | Prem. | Limit | Ret. | Prem. |
| D&O | 250,000 | 5,000 | 1,600 | 250,000 | 5,000 | 1,600 | 1,000,000 | 5,000 | 2,200 |
| D&O Factor | 1.00 | | | 1.00 | | | 1.00 | | |
| Securities/Other | | 5,000 | | | 5,000 | | | 5,000 | |
| Entity | 250,000 | 5,000 | 400 | 250,000 | 5,000 | 400 | 1,000,000 | 5,000 | 550 |
| EPLI | 250,000 | 7,500 | 3,829 | 250,000 | 7,500 | 3,829 | 1,000,000 | 7,500 | 5,265 |
| EPL Factor | 1.00 | | | 1.00 | | | 1.00 | | |
| Comb. Limit | ⊙ Yes ○ No | | | ○ Yes ⊙ No | | | ⊙ Yes ○ No | | |
| Def. Outside Limit? | ○ Yes ⊙ No | | | ○ Yes ⊙ No | | | ○ Yes ⊙ No | | |
| Crime | | | 0 | | | 680 | | | 0 |
| IA1: Empl. Theft | | | 0 | 100,000 | 5,000 | 566 | | | 0 |
| IA3: Inside Prem. | | | 0 | 100,000 | 5,000 | 113 | | | 0 |
| IA6: MO/Counterfeit | | | 0 | 50,000 | | 0 | | | 0 |
| | | Subtotal | 5,829 | | Subtotal | 7,008 | | Subtotal | 8,702 |

△ Liability Risk Modification Factors

| Board Expertise | 1.25 | Shareholders who are not D&Os | 1.00 | Merger & Acquisition | 1.00 |
| Family Control without Board Representation | 1.00 | EPL Class Action Exposure | 1.00 | Over 30% retired or Separated | 1.00 |
| Limited number of shareholders | 1.00 | Third Party Factor | 1.00 | Terminated, Sold or Merged Plans | 1.00 |
| Private Placement | 1.00 | Asset reversions | 1.00 | Time in Business | 1.00 |
| Publicly Traded Debt | 1.00 | ESOP Endorsement | 1.00 | Under Funded Defined Benefit Plans | 1.00 |
| High Risk Investments | 1.00 | Employers Association member | 1.00 | | |

FIG. 3

SYSTEM AND METHOD FOR COMPUTERIZED INSURANCE RATING

CROSS-REFERENCE TO RELATED APPLICATIONS

This application is a Continuation-In-Part of U.S. application Ser. No. 11/025,548, filed Dec. 28, 2004, which claims the benefit of U.S. Provisional Application No. 60/533,753, filed Dec. 30, 2003, the contents of the entire chain of applications are herein incorporated by reference.

BACKGROUND OF THE INVENTION

1. Field of the Invention

The present invention generally relates to the field of computer-based insurance processing. More specifically, the present invention discloses a novel rating system and method for possible insurance risk that integrates a legacy insurance underwriting process with a real-time on-line rating process which leverages extensible business logic electronic spreadsheets in a server based environment.

2. Description of Related Art

With regard to the insurance industry, records regarding issued policies, premiums, payments and payouts must be maintained for extended periods of time. The insurance industry readily embraced computer and computer technology for the storage of their records and files and developed special purpose software systems that were suitable for the maintenance and storage of the insurance files.

As computer technology and computer software changes, the insurance industry is pressed to update and upgrade their equipment and facilities. For example, the current computerized process for underwriting an insurance policy is a textual-based system that is burdensome and not user-friendly. The process requires that the underwriter prepare forms using manual tabulation of data and, in cases, requires specialized knowledge with regard to translating human-readable information into computer-readable codes. This is time-consuming and labor-intensive. However, there is hesitation to upgrade current existing software, i.e., legacy processor and associated software, as there is a significant cost in time, labor and expense in transitioning existing legacy-software-based files to newer software.

Moreover, the process of insurance underwriting for a prospective applicant within these existing legacy-software-based systems begins from submission of account information of a user to rating a policy and proceeds to quote creation and finally to account booking. In policy rating, the rating engines within these systems require data files that are often manually created. These manual files have fields containing data that are not easily mapped to existing fields within the legacy systems and therefore, updating the rating engines and processes require a lot of manual manipulation. This manual manipulation considerably slows down the speed to market process for new insurance products. In addition, the manual nature of these data files prevents scalability as well as ease in implementing the insurance underwriting system on individuals' computers, such as broker computers who utilize these underwriting systems to generate insurance quotes on a daily basis.

Hence, there is a need for a method and system that is not time-consuming, burdensome and labor-intensive to develop, implement and maintain rating engines that affords an underwriter the ability to process electronically the factors that underwrite an insurance policy while providing any legacy interface to utilize the rating system.

BRIEF SUMMARY OF THE INVENTION

This invention relates generally to computer-based insurance risk processing and more specifically to integrating a computer-based rating system into an insurance underwriting process.

An object of the present invention is to overcome these and other drawbacks of process of rating possible insurance risk.

Another object of the present invention is to provide a back-end system to output and consume an XML stream independent of a front-end system also known as loose coupling.

Yet another object of the present invention is to improve response time by providing server based rating spreadsheets that utilize calculation services or engines without the added complexity and cost of a full spreadsheet application.

Another object of the present invention is to improve speed to market insurance processing by providing a system that utilizes rating engines provided on a server enabling batch processing in addition to interactive processing.

In one aspect of the invention, a computer system to perform the process of rating possible insurance risk comprises one or more browsers operative to communicate associated information to a legacy computer system. A web page receives the associated risk information and produces an XML file that is sent to a back-end processing system. The back-end processing system, comprising of a web service, maps the respective data. The data, which is embedded within the XML file is mapped into electronic spreadsheet program workbooks that were created by Actuarial system. A back-end Electronic spreadsheet program Calculation Services engine utilizing formulas, calculate premiums and rating information that is subsequently returned to the Web service. The Web-service outputs an XML string containing premiums and rating information and sends this XML file to the legacy system to be displayed through a web page. The legacy processing system communicates with the web page and may utilize this rating information to generate a representative insurance quote utilizing the received data.

In another aspect of the invention, a system for rating possible insurance risk is provided comprising a user interface in electronic communication with a user for receiving user data, the user interface is provided on a legacy computer system; a web service is in electronic communication with the legacy computer system for receiving the user data, wherein the web service is also provided for transmitting rating information to the legacy computer system; a calculation engine is in electronic communication with the web service for calculating insurance data; the calculation engine transmits the calculated data to the web service, and wherein the legacy system parses the rating information and displays it on the user interface.

The present invention also comprises a method of rating possible insurance risk comprising the steps of receiving, via a user interface in electronic communication with a user computer, user risk information on an insurance risk, wherein the user interface is provided on a legacy computer system; receiving, via a web service in electronic communication with the legacy computer system, the user information; calculating, via a calculation engine in electronic communication with the web service, rating information for the possible insurance risk; transmitting, via the web service, rating information to the legacy computer system; parsing, via the legacy computer system, the transmitted rating information; and displaying, via the user interface, the rating information to the user.

Other objects, features and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE SEVERAL VIEWS OF THE DRAWING

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 3 illustrates an exemplary graphical user interface in accordance with the principles of the invention.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
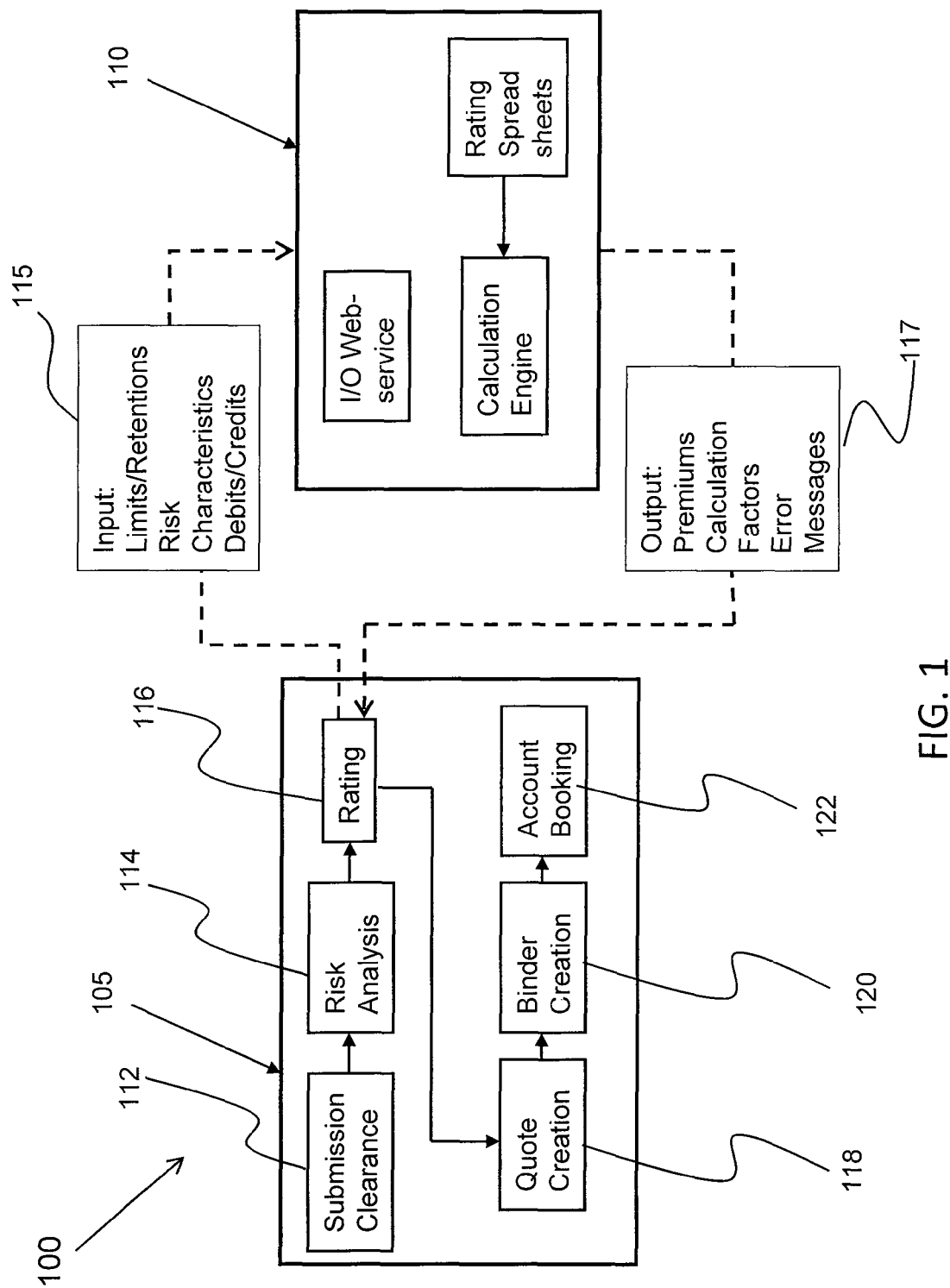
FIG. 1 is a block diagram of the high-level system architecture of an insurance underwriting system, which includes a rating system in accordance with the principles of the invention.

FIG. 1 shows a high-level block diagram of the overall insurance underwriting system 100 for an integrated method of insurance underwriting in accordance with the principles of the invention. Particularly, the insurance underwriting system 100 comprises a front-end legacy processing system 105 comprising a back-end server-based rating processing system 110. The legacy processing system 105 executes the processes of Submission Clearance 112, Risk Analysis 114, Rating 116, Quote Creation 118, Binder Creation 120 and Account Booking 122 in order to process an insurance policy for a user. Also, Rating 116 includes server-based rating processing system 110 communicating with legacy processing system 105 and receives inputs 115, such as limits, retentions, risk characteristics and debits/credits while also transmitting back outputs 117 such as premiums, calculation factors and error messages to legacy processing system 105.

Figure 2:
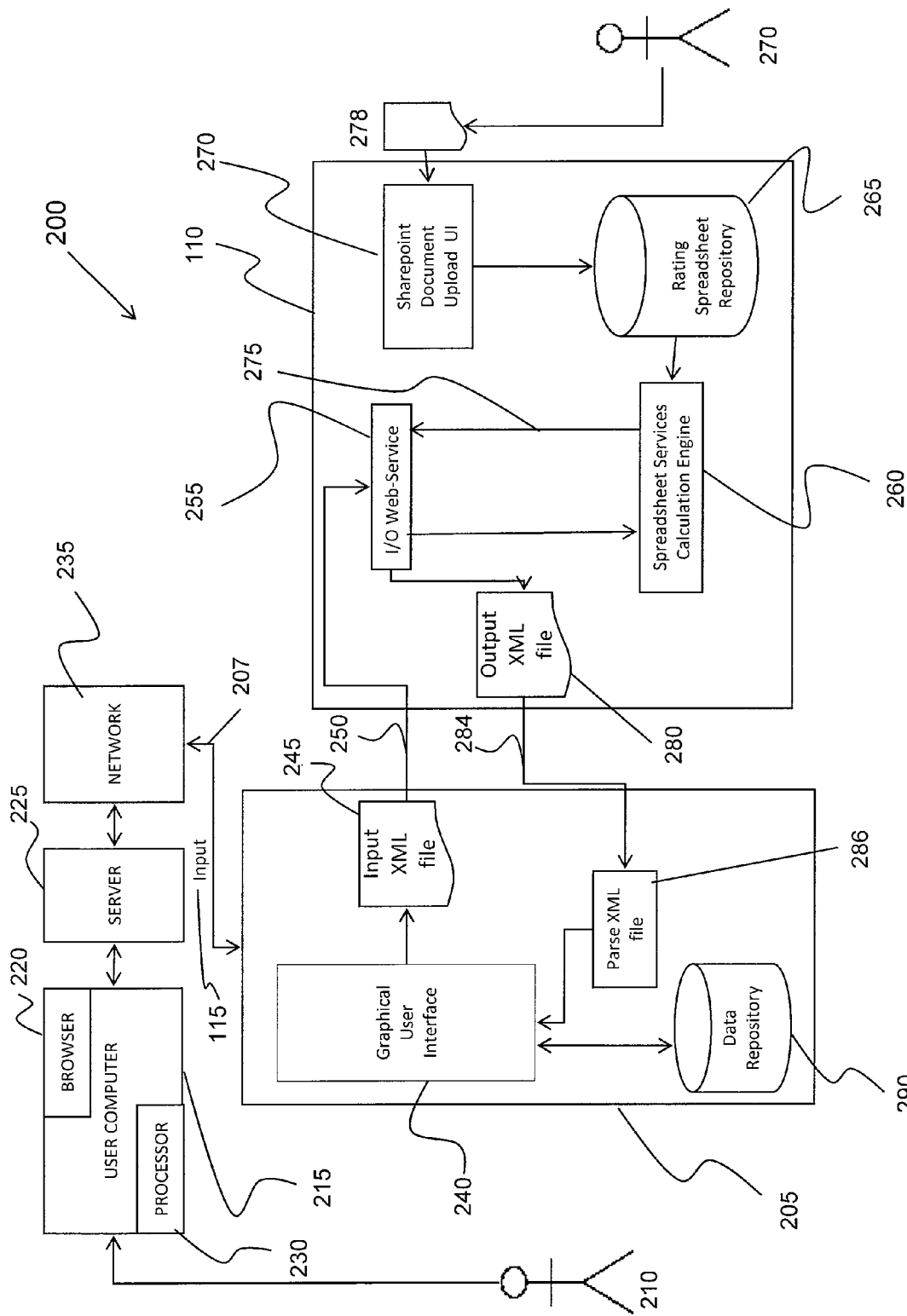
FIG. 2 is a block diagram of the system architecture of the rating system shown in FIG. 1 in accordance with the principles of the present invention.

Referring to FIG. 2, there is shown a block diagram of the overall server-based rating system 200 encompassed within rating process 116 of the preferred embodiment. In one aspect, the disclosure provides a comprehensive rating 116 process that is geared for supporting the pricing of insurance coverage for, in one non-limiting example, director and officer liability exposure although in other non-limiting examples, the rating system 200 may be designed to provide a comprehensive rating process for automobile, home or other similar types of insurance coverage.

The overall rating system 200 utilizes a front-end legacy computer system 205, which forms part of the legacy processing system 105, which was shown and described in FIG. 1. The legacy computer system 205 communicates with a back-end server-based rating processing system 110 in accordance with the preferred embodiment of the present invention. In this aspect of the system, one or more users, such as underwriter 210, employs underwriting computer system 215 which may reside, on one embodiment, remotely from the rating processing system 110, although in other non-limiting embodiments, the underwriting computer system may be contained within legacy computer system 205. The underwriting computer system 215 comprises browser software 220 that operates in association with a web/application server 225 via a processor 230 and Network 235 to communicate to system 200 through transmission link 207. Network 235, as would be recognized by those skilled in the art, may be a local area network (LAN), wide area network (WAN), or a public network, such as the internet or conventional telephone network that may include hardware interfaces and input and output devices as by way of example: facsimile machines, document scanners, printers, copiers and handheld communication devices that receive and send information from and to legacy system 205 and produce insurance policies, insurance statements and bills. Also, legacy system 205 may contain, in one non-limiting example, internet server software (e.g., internet Security and Acceleration Server software manufactured by Microsoft® and available on www.microsoft.com) communicating with GUI 240 resident on system 205. It should be appreciated that this invention is not limited to the internet server software manufactured by Microsoft® and any other similar internet server software may be utilized without departing from the spirit of the invention.

Further, the legacy computer system 205 is coupled to back-end Rating Processing system 110 through a physical transmission link, although in other non-limiting embodiments, a wireless link may be utilized. Transmission link may be, in one non-limiting embodiment an internet connection, although in other embodiment, a server access, an intranet connection, a T1 or T3 digital line, an ISDN line, LAN connections, a Wide Area Network, Ethernet, DSL connection or other wired or wireless connection may be utilized.

In legacy computer system 205, underwriter 210, may initiate the rating process 116 by inputting information 115 which may include risk information such as limits, retentions and factors into a web page residing on legacy computer system 205 and, in a preferred embodiment, this input information 115 is entered into respective fields within a graphical user interface 240 ("GUI"). The GUI 240 offers graphical icons, and visual indicators to provide a platform the underwriter 210 can interact with, for the tasks of gathering and producing information related to quote generation. The underwriter 210 accesses GUI 240 through underwriter computer system 215 by clicking a dedicated button on a webpage within the legacy computer system 205 to initiate the rating process 116. The underwriter 210 inputs information 115 for rating by accessing the GUI 240 across network 235 and inputting information 115. Further, the legacy system 205 encodes the inputted information 115, entered through GUI 240 and converts it into an input XML document 245 (i.e., a tagged document) containing rate information by field names. It should be appreciated that the XML document 245 is used both to encode documents and to serialize data and provides portability of data by helping disparate information systems share structured data. Further, the GUI 240 contains a servlet that accepts name/pair values of data and creates the XML document 245 based on a defined schema. In another non-limiting embodiment, legacy system 205 comprises data repository 290 comprising a legacy database for storing and retrieving calculated values 275, which will be shown and described below. Thus, the rating system 200 provides a novel method of implementing the rating process by utilizing legacy system 205 to create information and generate an XML file 245 that may be transmitted and processed in any number of back-end systems, such as, for example, back-end rating processing system 110. A non-limiting example of a sample input XML document MMProfWorksheet.xlsx having input information 115 is shown below:

Input XML File

```
<root>
    <WorkbookName>MMProfMPLWorksheet.xlsx</WorkbookName>
    <WorksheetName>MPL Rating</WorksheetName>
    <input>
        <EffDt>2/25/2008</EffDt>
        <ExpDt>2/25/2009</ExpDt>
        <RetroDt>2/25/2008</RetroDt>
        <Insured>Test Account</Insured>
        <HG>1</HG>
        <State>CT</State>
        <LimitO>2000000</LimitO>
        <LimitA>2000000</LimitA>
        <Ded>25000</Ded>
        <Policy_Type>Admitted</Policy_Type>
        <Revenue>5000000</Revenue>
        <Revenue1>5000000</Revenue1>
        <Revenue2>5281300</Revenue2>
        <Revenue3 />
        <Revenue4 />
        <Revenue5 />
        <Char1>0.90</Char1>
        <Char2>0.90</Char2>
        <Char3>0.95</Char3>
        <Char4>0.90</Char4>
        <Char5>1.00</Char5>
        <EffDtPrior>2/25/2007</EffDtPrior>
        <ExpDtPrior>2/25/2008</ExpDtPrior>
        <RetroDtPrior>2/25/2007</RetroDtPrior>
        <OccurrencePrior>1000000</OccurrencePrior>
        <AggregatePrior>1000000</AggregatePrior>
        <DedPrior>10000</DedPrior>
        <WtdRevPrior>2500000</WtdRevPrior>
        <PriorPrem>5000</PriorPrem>
    </input>
    <OutputFields>WeightedRev,Base,ILF,DedFactor,Subtotal,
    PAF,StateFactor,TotalMOD,FinalPremium,PPM,BasicLimits,
    CurrentAB,PriorAB,Change</OutputFields>
</root>
```

Also, legacy computer system 205 communicates with Rating Processing system 110 through transmission link 250 in order to retrieve premiums and similar types of insurance data. Particularly, the Rating processing system 110 includes components of an I/O Web Service 255, an electronic spreadsheet program calculation services engine 260 and Rating Spreadsheet Repository 265 to process any information received from legacy computer system 205. The legacy computer system 205 communicates with Web Service 255 over physical transmission link 250 to transfer input information 115 embedded as XML document 245 to Web Service 255. The Web service 255 is a software system designed to support interoperable machine-to-machine interaction over network 235 and has executable code that can be accessed over network 235, such as the Internet, and executed on a remote system, such as Rating Processing System 110 hosting the requested services. The Web Service 255 is in a generic form with no hardcoded mapping. Any input may be fed into the web service 255 through the XML document 245 and if a corresponding cell name is found in a requested workbook accessed from Rating Spreadsheet Repository 265 (which will be shown and described below), the mapping will take place. Web Service 255 provides programmatic access to an electronic spreadsheet program such as Microsoft® Office Excel® workbooks and enables a user to load, calculate and display workbooks within the rating system 110. Web Service 255 loads workbooks, sets values in cells and named ranges, refresh external data connections and extracts calculated results (including cell values, the entire calculated workbook, or a snapshot of the workbook). In one embodiment, the workbooks are dynamically mapped by a plurality of named ranges or business oriented naming conventions which makes the workbooks easily adaptable and extensible. Web service 255 parses the XML file 245 and accesses electronic spreadsheet program services calculation engine 260 to set cell values within dynamically mapped workbooks. The node (or field) names for Input XML document 245 are matched to corresponding defined cell names within the workbooks and data is dynamically mapped from the XML file 245 into the cells of the workbooks. It should be appreciated that data mapping may be implemented in any variety of methods in order to translate the XML data 245 into other readable data as long as this data mapping does not detract from the spirit of the invention.

Also as shown, one or more actuaries, such as actuary 270 builds a plurality of rating engines or spreadsheets, such as Rating Engine or Spreadsheet 278 based upon predetermined business rate plans. The rating spreadsheet 175 is saved as electronic spreadsheet program files and preferably contain one input/output page along with multiple calculation and reference worksheets. This electronic spreadsheet 278 includes cell names that are identical to the field names contained within the Input XML document 245 created by legacy system 205. Also, spreadsheet 278 is stored in Rating Spreadsheet Repository 265. It should be appreciated that a plurality of Electronic Spreadsheet Program Rating engines, such as rating engine 278, may be created by actuaries 270 in order to process possible insurance risk through the rating system 200.

Rating Spreadsheet Repository 265 is a Microsoft® SQL Server 2005 Database that stores Rating Spreadsheet 278, although in other non-limiting embodiments, any similar type of database may be utilized without departing from the spirit of the invention. The spreadsheet 278 is uploaded into Rating Processing System 110 by "publishing" within an electronic spreadsheet program (i.e., saving) and storing it into a particular library within Rating Spreadsheet Repository 265, although in other non-limiting embodiments, the spreadsheet 278 is uploaded by utilizing document upload User Interface 270 (i.e., a graphical user interface) and saving spreadsheet 278 to Rating Spreadsheet Repository 265. It should be appreciated that during the rating process, an instance of rating spreadsheet 278 is loaded into Spreadsheet Calculation Engine 260 from Repository 265. Rating spreadsheet 278 accepts inputs and provides outputs at the time of rating only and no information is saved to the rating spreadsheet 278. Once the rating process is completed, the instance of the spreadsheet 278 is closed with no entered values saved.

Also, Web Service 255 utilizes Spreadsheet Services Calculation Engine 260 to calculate, set and extract values from workbooks, as well as refresh external data connections. Using Web Service 255, XML node/field names are matched to electronic spreadsheet program defined cell names within workbooks extracted from the Rating spreadsheet Repository 265 and data is mapped into these workbooks. The Web Service 255 retrieves calculated values 275 from the Spreadsheet Services Calculation Engine 260, such as in one non-limiting example, premiums and calculation factors. Values 275 are translated into an Output XML file 280 by Web Service 255 and transmitted to legacy computer system 205. A non-limiting example of an output XML file 280 is shown for field names such as, in one non-limiting example, Weighted Rev, Base, ILF, DedFactor.

Output XML File

```
<root>
    <output>
        <option>
            <WeightedRev>5,036,006</WeightedRev>
            <Base>11,499</Base>
            <ILF>1.580</ILF>
            <DedFactor>-0.100</DedFactor>
            <Subtotal>17,018</Subtotal>
            <PAF>0.55</PAF>
            <StateFactor>1.00</StateFactor>
            <TotalMOD>#N/A</TotalMOD>
            <FinalPremium>#N/A</FinalPremium>
            <PPM>#N/A</PPM>
            <BasicLimits>6,324</BasicLimits>
            <CurrentAB>#N/A</CurrentAB>
            <PriorAB>-</PriorAB>
            <Change>#N/A</Change>
        </option>
    </output>
</root>
```

Also, Web Service 255 transmits calculated values 275 as an output XML document 280 to legacy system 205. Particularly, Web Service 255 tags calculated values 275 as a single string output XML document 280 and sends document 280 through communication link 284 to legacy system 205. It should be appreciated that the XML file 280 also provides portability of data by causing disparate information systems, such as rating processing system 110 and legacy system 205, share structured data calculated within spreadsheet calculation services 260. The output XML file 280 is parsed 286 within legacy system 205 and calculated values 275, such as premiums, are displayed to underwriter 210 through GUI 240. In another non-limiting embodiment, legacy system 205 comprises data repository 290 comprising a legacy database for storing and retrieving calculated premiums and calculation factors.

Furthermore, Spreadsheet Calculation Services 260 component loads workbooks from Rating Spreadsheet Repository 265 and calculates values based on predetermined formulas. Data values are mapped into workbooks and Spreadsheet Services Calculation Engine 260 calculates values and provides calculated data 275 to web service 255. Particularly, premium and rating information is communicated to web service 255. Additionally, spreadsheet calculation services 260 maintains an active session for the duration of interactions with the same workbook (i.e., an instance of the workbook is open) by underwriter 210. A session is closed when the underwriter 210 explicitly closes it or when the session times out on the server.

FIG. 3 illustrates an exemplary GUI 240 for initiating the rating process 116 for, in one non-limiting embodiment, directors and officer's liability insurance risk within system 200. In this illustrated interface 240, input information 115 relating to the rating process 116 such as, in one non-limiting embodiment, limits, retentions and risk modification factors may be entered at blocks 305, 310 and 315 respectively. As shown, the GUI 240 provides underwriter 210 to vary the limits 305 for options 1, 2 and 3 and returns premiums 320 for the different options 1, 2 and 3. Also, as was previously seen in FIG. 2, underwriter 210 may utilize a personal computer or workstation 215 communicating with legacy system 205 across transmission link 207 to input values, such as in one non-limiting embodiment, limits, retention and risk modification factors.

Figure 4:
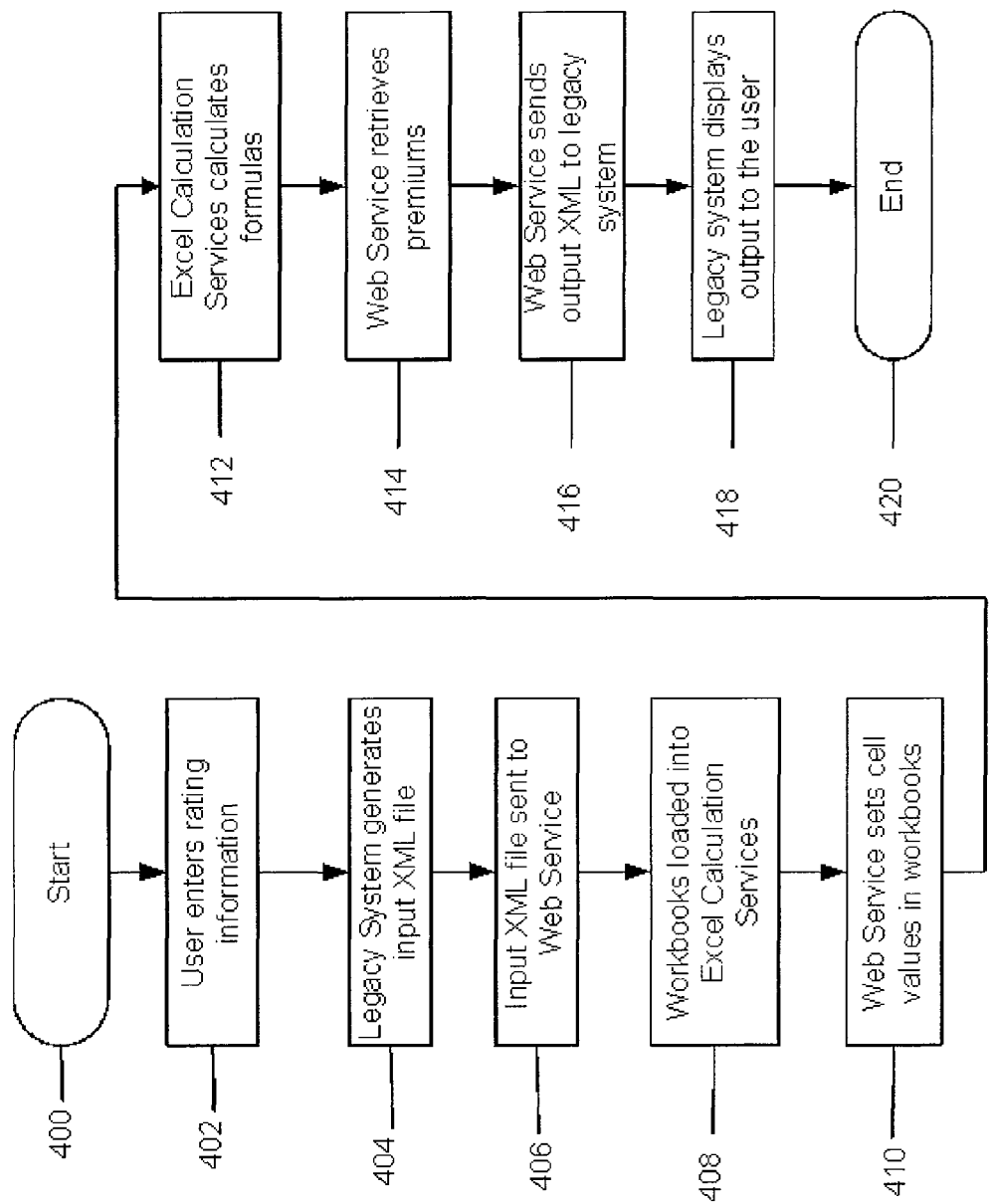
FIG. 4 is a flow chart, which illustrates an overall process of rating possible insurance risk.

FIG. 4 shows a flowchart, which describes the overall method of rating possible insurance risk according to the preferred embodiment of the invention. The method begins in step 400 and is followed by step 402 whereby a user enters rating information into a graphical user interface located in a Web Page. The user enters rating information such as limits, retentions, risk characteristics, debits and credits and submits this information through the Web Page. Next, in step 404, the Web Page generates an input XML file by converting the input XML file containing rate information by field. Next, in step 406, the input XML file is sent to the I/O Web Service residing in the Rating Processing System. Next, in step 408, workbooks having cell names corresponding to field names in the XML file are loaded by Spreadsheet Calculation Services Engine. Next, in step 410, the I/O Web Service parses the XML file and uses Spreadsheet Calculation Services to set cell values as defined in the field mappings into the loaded workbooks. Next, in step 412, Spreadsheet Calculation Services calculates all formulas and in step 414, the Custom Web Service uses Spreadsheet Calculation Services Engine to retrieve premiums and factors from cells. Next, in step 416, I/O Web Service generates the proper output XML file and transmits it to the Web Page in the legacy system. Next, in step 418, the Web Page parses the output XML file and displays the output to the user. The method ends in step 420.

Figure 5:
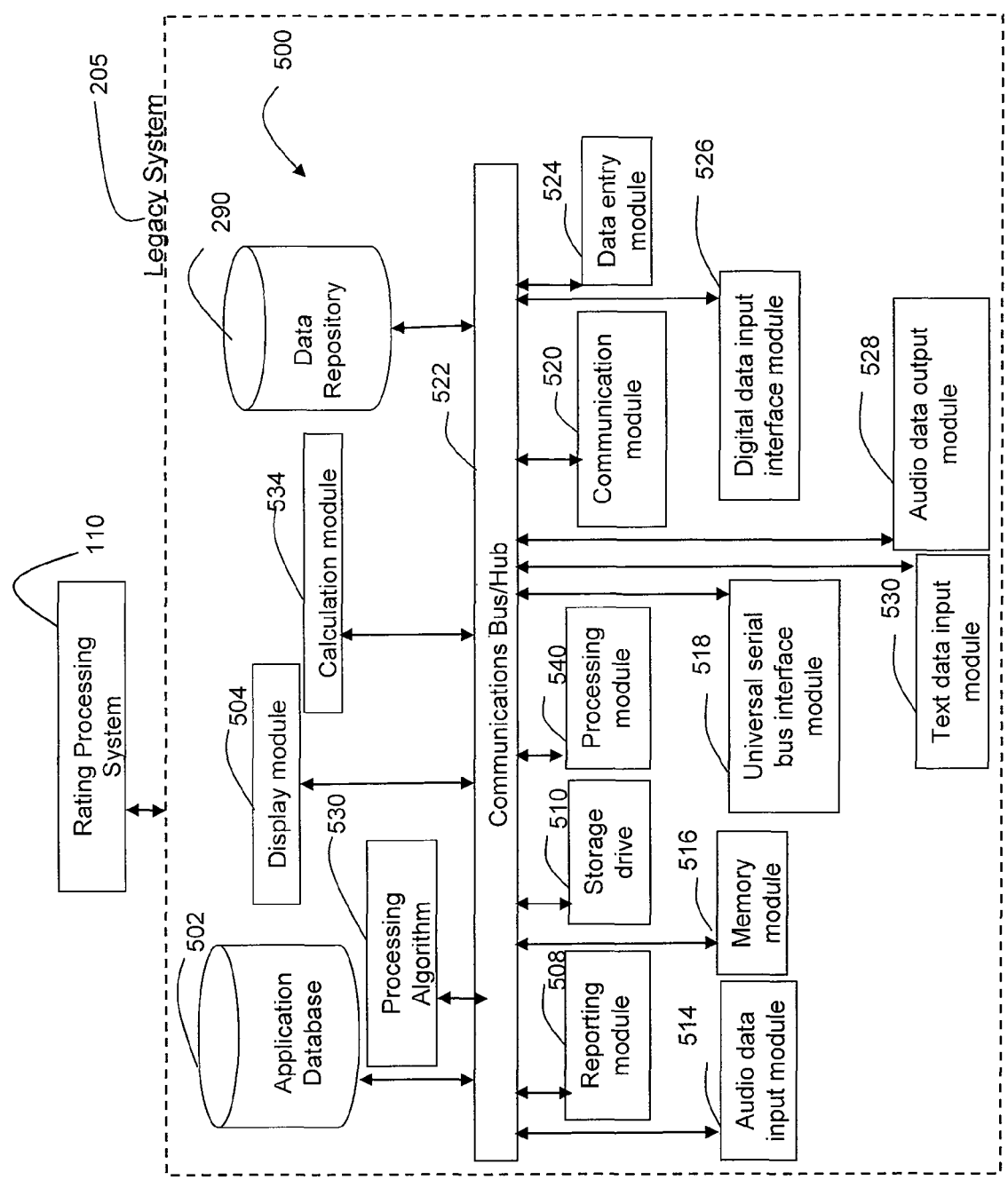
FIG. 5 illustrates a block diagram of the detailed computing system in accordance with the principles of the invention.

Now referring to FIG. 5, a representative block diagram of the computing system 500 provided at legacy system 205 and in communication with Rating processing System 110 is illustrated on which the methods described above may be implemented. The present invention relates to a novel system and method for server-based rating a possible insurance risk and includes at least one central processing computer or computer network server. Computing system 500 may include a processing module 540 having at least one controller or central processing unit (CPU or processor), a communications module 520 controlling at least one communications port or hub 522, a memory module 516 having at least one random access memory (RAM) and/or at least one read-only memory (ROM) and one or more data storage modules 502, 510 and 290 having databases or data storage devices. All of these later elements are in communication with the processing module 540 to facilitate the operation of the computing system 500. The computing system 500 may be configured in many different ways. For example, computing system 500 may be a conventional standalone server computer or alternatively, the function of server may be distributed across multiple computing systems and architectures.

Computing system 500 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port 522 that serves as a primary communication link with other servers, client or user computers and other related devices. The communications hub or port 322 may have minimal processing capability itself, serving primarily as a communications router. A variety of communications protocols may be part of the system, including but not limited to: Ethernet, SAP, SAS®, ATP®, Bluetooth®, GSM® and TCP/IP.

Data storage modules 502, 510 and 290 may include a hard magnetic disk drive, optical storage units, CD-ROM drives, RAM, ROM or flash memory, and these modules 502, 510 and 290 contain databases, such as application database 502, and are used in storing premium information as well as rating data in accordance with the present invention. In one embodiment, database software creates and manages these data storage modules 502, 510 and 290. Data comparison related calculations and/or algorithms, such as processing algorithm 530, of the present invention are stored in storage drive 510 and executed by the CPU.

The processing module 540 processes information through a controller, which includes a processor, such as one or more conventional microprocessors and one or more supplementary co-processors such as math co-processors. The processor is in communication with a communication port through which the processor communicates with other devices such as other servers, user terminals or devices. The communications port 522 may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time and may require several steps to be performed to establish a communication link between the devices.

The processing module 540 also is in communication with data storage modules 502, 510 and 290. The data storage modules 502, 510 and 290 may include an appropriate combination of magnetic, optical and/or semiconductor memory, and may include, for example, RAM, ROM, flash drive, an optical disc such as a compact disc and/or a hard disk or drive. The processing module 540 and the data storage modules 502, 510 and 290 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wire line medium or combination of the foregoing.

The data storage modules 502, 510 and 290 may store, for example, (i) a processing algorithm 530 (e.g., computer program code and/or a computer program product) adapted to direct the controller in accordance with the present invention, and particularly in accordance with the processes described in detail hereinafter with regard to the controller; (ii) at least a database adapted to store information that may be utilized to store information required by the processing algorithm 530. The database includes multiple records; each record includes fields that are specific to the present invention such as limits, retentions, risk factors, etc.

The processing algorithm 530 may be stored, for example, in a compressed, an uncompiled and/or an encrypted format, and may include computer program code. The instructions of the processing algorithm 530 may be read into a main memory of the processor from a computer-readable medium other than the data storage modules 502, 510 and 290, such as from a ROM or from a RAM. While execution of sequences of instructions in the processing algorithm 530 causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as verifying that data has been received by the data storage modules 502, 510 and 290, verifying that reports have been processed by the reporting module 508, as well as to perform any other processes not specifically assigned to any other module within the computing system 500. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

All of the modules described herein are operably interconnected via a bi-directional connection with a central communications hub or bus 522. The communications hub 522 serves to receive information from every single module, as well as to transmit information from one module to another. The rating Processing System 106 transmits and receives data, to and from the computing system 500 via any standard means known in the art. The communications module 520 transmits and receives data, to and from the computing system 500 via any standard electronic means known in the art. The computing system 500 consists of a display module 504 and a data entry module 524.

Additionally, computing system 500 includes a computer-processing algorithm 530 for performing risk analysis, rating, quote creation, binder creation and account booking, all of which are integrated together in computing system 500 for generating an insurance policy.

Computer processing algorithm 530, residing within computing system 500, may include rules to generate insurance policies. In addition, the computing system 500 includes a reporting module 508. The reporting module 508 may be used for producing reports of information associated with rating a possible insurance risk and generating an insurance policy, as well as any other kinds of related reports.

The application database 502 may be internal to the computing system 500, for the purposes of allowing further controls of data access, to be implemented if needed. However, a data repository 290, which may be external to the computing system 500, may be used without departing from the spirit of the present invention. It should be appreciated that data storage modules 502, 510 and 290 may be relational databases, or any similar type of database structure comprising tables of rows and columns.

Additionally, the computing system 500 includes a text data input module 530 for inputting data in the form of text and a data entry module 524 for entering a variety of forms of data and inputting the data into the computing system 500.

Finally, the computing system 500 includes an audio data input module 514 for receiving and inputting audio information, a calculation module 534 for performing any necessary mathematical calculations, a memory module 516 for temporarily storing information as it is being processed by the processing module 540, a universal serial bus interface module 518 for receiving and transmitting data to and from devices capable of establishing a universal serial bus connection and a digital data input interface module 526 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Computing system 500 of the present invention may also interact and/or control one or more user devices or terminals 215. The user device or terminal 215 may include any one or a combination of a personal computer, a mouse, a keyboard, a computer display, a touch screen, LCD, voice recognition software or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An adaptive system for rating possible insurance risk comprising:
    a user interface in electronic communication with a user computer for receiving risk information, said user interface in communication with a legacy computer system;
    a web service in electronic communication with said legacy computer system for receiving said risk information, wherein said web service also being provided for transmitting risk rating information to said legacy computer system;
    a calculation engine in electronic communication with said web service and configured to:
    load, from a data repository for storing rating spreadsheets for calculation of risk rating data, instances of selected ones of workbooks of the stored spreadsheets;
    populate cells of said workbooks with data based on said received risk information;
    perform calculations employing formulas included in said workbooks to determine risk rating information;
    furnish results of the calculations from the cells of the workbooks to the web service; and
    close the instances of the workbooks without saving entered values;
    and said legacy system parsing said risk rating information for display on said user interface,
    wherein the rating spreadsheets are further for calculating premium data; the calculation engine is further configured to perform calculations employing formulas included in said workbooks to determine premiums; and said legacy system is further for parsing said premiums for display on said user interface, and
    wherein the workbooks are loaded responsive to identifying a cell name in a workbook corresponding to a field name in an XML document generated by the legacy system for furnishing the risk information to the web service, and the data from the XML document is mapped to cells in the workbooks having corresponding names.

2. The system of claim 1, wherein the legacy computer system transmits said risk information as an input XML file.

3. The system of claim 2, wherein said web service provides said risk rating information to said legacy computer system as an output XML file.

4. The system of claim 1, wherein the data repository is configured to store calculations for one or more of the rating spreadsheets.

5. The system of claim 1, wherein said data repository is further configured to store data for said rating spreadsheets.

6. The system of claim 1, wherein said rating spreadsheets are provided to said calculation engine via a communications bus.

7. The system of claim 2, wherein said legacy system has a plurality of rules for converting said rating information into said input XML file.

8. The system of claim 7, wherein said web service dynamically maps data in said input XML file into said cells of said workbooks.

9. The system of claim 1, further comprising an upload interface for saving said rating spreadsheets into said data repository.

10. A computer implemented method for rating possible insurance risk, comprising the steps of:

receiving, via a user interface in electronic communication with a user computer, insurance risk information, wherein the user interface is in communication with a legacy computer system;

receiving, via a web service in electronic communication with the legacy computer system, the insurance risk information;

loading, from a data repository for storing rating spreadsheets for calculation of risk rating data, by a calculation engine in electronic communication with the web service, instances of selected ones of workbooks of the rating spreadsheets;

populating cells of said workbooks with data based on said received insurance risk information;

calculating, via the calculation engine employing formulas included in said workbooks, risk rating information, furnishing the risk rating information resulting from the calculating, from the cells of the workbooks to the web service, and closing the instances of the workbooks without saving entered values;

transmitting, via the web service, the furnished risk rating information to the legacy computer system;

parsing, via the legacy computer system, the transmitted risk rating information; and displaying, via the user interface, the risk rating information to the user wherein the rating spreadsheets are further for calculating premium data; the calculation engine is further configured to perform calculations employing formulas included in said workbooks to determine premiums: and said legacy system is further for parsing said premiums for display on said user interface, and wherein the workbooks are loaded responsive to identifying a cell name in a workbook corresponding to a field name in an XML document generated by the legacy system for furnishing the risk information to the web service, and the data from the XML document is mapped to cells in the workbooks having corresponding names.

11. The computer implemented method of claim 10, wherein the legacy system provides the insurance risk information to the web service as an input XML document.

12. The computer implemented method of claim 11, wherein the web service provides the risk rating information to the legacy computer system as an output XML document.

13. The computer implemented method of claim 12, further comprising the step of storing, via the data repository, calculations for the rating spreadsheets.

14. The computer implemented method of claim 13, further comprising the step of storing, via the data repository, data for the rating spreadsheets.

15. The computer implemented method of claim 14, wherein the rating spreadsheets are provided to the calculation engine via a communications bus.

16. The computer implemented method of claim 15, wherein the legacy system has a plurality of rules for converting the insurance risk information into the input XML file.

17. The computer implemented method of claim 16, wherein the web service maps data in the input XML file into the rating spreadsheet.

18. The computer implemented method of claim 17, further comprising the step of storing, via an upload interface, the rating spreadsheets into the data repository.

19. A system for rating possible insurance risk comprising:
a user interface in electronic communication with a user computer for receiving risk information, said user interface in communication with a legacy computer system;
a web service in electronic communication with said legacy computer system for receiving said risk information, wherein said web service also being provided for transmitting risk rating information to said legacy computer system;
a calculation engine in electronic communication with said web service for calculating said risk rating information;
a data repository in communication with said calculation engine for storing calculations for rating spreadsheets, wherein instances of selected ones of workbooks of the rating spreadsheets are loaded from the data repository by the calculation engine, cells of the workbooks are populated with data based on said received risk information, calculations in accordance with formulas included in said workbooks are performed to determine risk rating information, results of the calculations from the cells of the workbooks are furnished to the web service, and the instances of the workbooks are closed without saving entered values, and wherein said calculation engine transmits said risk rating information to said web service, and said legacy system parses said risk rating information for display on said user interface wherein the rating spreadsheets are further for calculating premium data; the calculation engine is further configured to perform calculations employing formulas included in said workbooks to determine premiums; and said legacy system is further for parsing said premiums for display on said user interface, and wherein the workbooks are loaded responsive to identifying a cell name in a workbook corresponding to a field name in an XML document generated by the legacy system for furnishing the risk information to the web service, and the data from the XML document is mapped to cells in the workbooks having corresponding names.

20. The system of claim 19, wherein the workbooks are loaded responsive to identifying a cell name in a workbook corresponding to a field name in a document generated by the legacy system for furnishing the risk information to the web service.

21. The system of claim 20, wherein the document is in XML format, and the data from one or more fields in the XML format document is mapped to one or more cells in the workbook having the corresponding name.

22. The system of claim 1, wherein the risk information comprises limits, retentions and risk modification factors.

* * * * *